United States Patent [19]
Clancey

[11] Patent Number: 5,344,566
[45] Date of Patent: Sep. 6, 1994

[54] DELEADING WASTEWATER REDUCTION PROCESS

[76] Inventor: William F. Clancey, 8 Irving St., Peabody, Mass. 01960

[21] Appl. No.: 852,564

[22] Filed: Mar. 17, 1992

[51] Int. Cl.$^5$ .............. B01D 61/02; B01D 61/04; B01D 61/08; B01D 61/12
[52] U.S. Cl. .................. 210/638; 210/639; 210/652; 210/681; 210/724; 210/195.2; 210/257.2; 210/241
[58] Field of Search .............. 210/718, 711, 294, 634, 210/638, 639, 644, 649–652, 681–686, 702, 723, 724, 725, 195.2, 257.2, 241, 294, 321.6, 321.65, 321.72

[56] References Cited

U.S. PATENT DOCUMENTS

| | | | |
|---|---|---|---|
| 4,261,833 | 4/1981 | Pohl et al. | 210/711 |
| 5,045,214 | 9/1991 | Walker | 210/718 |

*Primary Examiner*—Frank Sever

[57] ABSTRACT

This invention provides a fast and efficient method and process to remove lead from washwater streams that are part of the deleading process. By employing a two step process using epsom salts as a precipitating chemical to convert dilute lead concentrations into a very slightly soluble solid and then processing the small residue with a reverse osmosis unit the lead is totally removed from part of the water and the lead containing reject stream from the reverse osmosis unit is recucled through the process to again treat the lead. A reduction in total waste volume of over 90% is achieved.

18 Claims, 2 Drawing Sheets

DELEADING WASTEWATER REDUCTION PROCESS

FIELD OF INVENTION

This invention is a waste reduction process that removes lead and other metals that are dissolved at relatively low levels in an aqueous medium. The system to process waste fluids is especially for removal of lead from deleading wash fluids and similar fluids.

BACKGROUND OF INVENTION AND PRIOR ART

The Commonwealth of Massachusetts is a leader in forcing the removal of lead from dwellings. The older houses and apartments were often painted with lead paints which have a faintly sweet taste attractive to some children. Since lead is a neurotoxin which has been shown to retard brain development and functions, lead is routinely removed from residences by the requirements of various Massachusetts State Laws. This Massachusetts concern has subsequently been reflected in the Laws and Regulations of many other jurisdictions. On a Federal level, the EPA has reflected the concern with lead by strict potable water testing procedures for lead indicating concerns about lead content of water at the highest levels of government.

The deleading process for buildings typically involves scraping or chemical removal of paint on specified surfaces to a statutorily determined height and often also requires wood replacement. Mere scraping alone as a method to remove the paint is insufficient since lead compounds and salts soak into pores and grain on the surface of wood. The Chemical removal process using alkaline gels containing solvents and strippers such as trisodium phosphates reaches the soaked in salts but the chemical strippers must be flushed from the surface and the surface must be neutralized as part of the removal process. Especially in the chemical removal process, a water wash is needed to remove traces of lead remaining on the wood as well as to neutralize the chemical strippers. In dry scraping a wash is still needed to reduce and remove dust and particles and to do a final cleaning of the wood. The removed paint is a lead containing hazardous waste and must be disposed of properly by use of licensed waste handling firms. The paint solids are relatively dense and total solids generation is typically only a drum per house. The wash water is many times the volume of the solids removed. The wash water also contains significant lead contents and must also be removed as a hazardous waste. Since the cost of hazardous waste removal in MA is slightly over $400 per 55 gallon barrel, and since at least 5 barrels of this contaminated water are produced for a typical deleading job, there is a considerable cost for waste water removal in each deleading operation.

In the past much waste water found its way into drains and sewers. This potential contamination of potable water supply and destruction to marshes and rivers was ignored. A result of this and other contaminants being added to rivers is the toxic nature of local harbor mud. Now, there is tighter enforcement of removal and tracing of wastes so this illegal use of local sewers is being halted. Tracing of all disposal streams and insuring waste streams are treated properly should continue to be an area of increasing concern. Despite the concern and the rules, no one has found an ecconomic way to stop the easy profits to be made by illegal dumping of these washwater waste streams. There is thus a need for a detailed tracing system for wastes or for a simple method to eliminate the wastes on site and thus eliminate the temptations to illegally dump wastes, especially those wastes that are dilute and not obvious There is a need for site treating of the waste water to reduce its impact on deleading costs and to make environmental compliance more likely.

The problem of deleading is not restricted to household deleading operations. There are numerous bridges, oil tanks and other steel structures that were painted with lead pigment containing protective coatings. These are often red lead primers as well as other paint materials. This lead paint is a problem for workers on or near the tanks as the paints deteriorate and also leaches into the water supply when the surfaces are contacted by acid rain or other pollution. In many construction projects on bridges, the workers, who are now aware of lead hazards, will not start on steel work until the structure has been deleaded.

The bridge deleading experience in Massachusetts has been especially difficult. Some early sandblasted deleading projects created so much contaminated dust that the surrounding area became seriously contaminated and numerous houses had to have lead containing dust removed. The current requirement for bridge deleading is to use vacuum protected sandblasting, needle guns, or chemical deleading compounds. The two allowed mechanical deleading processes are very slow while there is contaminated wastewater generated by the chemical processes requirement for neutralization and washdown. A process to treat or reduce wastewater from chemical deleading would allow this process to dominate the field since it is quick and easy as compared to the other allowable processes. Chemical methods are also dust free.

There are a series of methods that have been attempted to solve the contaminated wastewater problem. The most common legal way to solve the low level contaminated water problem is to truck it to a processing facility where it is concentrated with elaborate chemical treatments. It can be then landfilled in class 1 or class 3 hazardous waste landfills. Another common method is to first evaporate the water, then when there is a concentrated fraction left, disposing of the smaller concentrated stream by trucking to a chemical plant which is cheaper since there is less volume. The costs are totally related to volume and not to content so concentration is a viable way to save on disposal. In other cases ion exchange resins and ion specific chemicals have been used. The chemicals to remove lead in moderate concentrations in water are either expensive to use or are very slow to react.

Some approaches use just a settling step such as the Johnson U.S. Pat. No. 4,898,678 but the settling taught by Johnson is for particulate lead metal, not the dissolved salts that are a problem in deleading cleanups.

An example of expensive chemical beneficiation of lead contaminated wastewater is the use of EDTA reagents to remove heavy metals. These metal combinant chemicals, used widely to chelate lead and in labs, are very expensive. Chemical approaches are noted in Patents such as Rothman U.S. Pat. Nos. 4,222,897 & 4,338,288 where a sorbant of Manganese nodules with occluded sulfur is used for deleading of waste streams. In another chemical approach Sayles in U.S. Pat. No. 4,954,230 used Methane di-sulfonic acid as a deleading approach. A precipitation method suggested by Zeijlstra in U.S. Pat. No. 4,338,200 uses a hydroxide precipitation in closely controlled temperature and pH ranges to remove lead.

An example of the slow processes is carbonate reduction of the waste water where solid wastes are mixed with lime and an agent containing carbon dioxide and/or bicarbonate to reduce the solids to a non leachable form. Such a concept may allow a carbonate reduction of liquids also. This is shown in U.S. Pat. No. 4,137,339. The process indicated is interesting and is effective if the solutions and reactions are kept cold but this system is less effective as temperature increases and the process is slow. Since chemical deleading processes are most effective at room or higher temperatures, the need for cool reactions is not an advantage. There is still a need for a simple and effective reaction process to remove lead at low cost.

Another process is the use of electrolysis to obtain electrolytic metallic precipitin on a stainless steel cathode followed by absorber columns in U.S. Pat. No. 4,954,230 by Rudolph Kirch where the metal is precipitated on a stainless screen. This type process is effective only for high levels of lead and is energy inefficient at low concentration levels.

At present the expensive and fast chemical removal processes or the very slow but high removal quality methods can be used.

No basic removal system is available which meets the requirements of quick yet relatively low cost lead removal of dissolved lead that is at moderate to high lead content levels.

There are other solutions designed for very low lead content fluids. Lead removal from water is done in several environments presently. Drinking water lead removal has become a major industry. While the rationale of this need is dubious, the use of ion exchange resins and reverse osmosis is effective only to lower trace amounts of lead. The size of the reverse osmosis units and the cost of the units make these approaches useful only for trace amounts.

Included in the potable water deleading systems are a variety of complex methods for removal of trace amounts of lead, they usually include several steps. One common system combines a ion exchange column with a carbon bed absorber. In another a low volume reverse osmosis unit is used to remove trace amounts of lead. In some cases, a bisulfide iron removal system is also part of the water purification system with the iron oxidized and then removed by an ion exchange column. These systems all fail when they are called on to handle more than trace amounts of lead or other dissolved metals since the removal media rapidly becomes clogged or loaded.

In plating operations extremely high lead contents in strong acid are encountered. This type of lead removal can be handled with a electrolytic process plating part of the lead from a solution that is then reused to provide lead free acid and wash baths without creating waste. The use of hazardous chromates or sulfides can also be allowed in these chemist controlled systems. The plating cleanup systems are typically multi step processes with many chemical checks between stages.

At present, there is no simple and effective method to remove lead from washwater streams. As a result major costs are encountered in every lead project that follows the rules in waste washwater disposal.

DESCRIPTION OF THE INVENTION

This invention solves one of the major problems in deleading, the handling of lead contaminated waste from washdowns.

The invention also treats the portion of the waste that is most likely to be serritiously dumped since it is the hardest to identify and track.

The invention allows the concentration of lead residues into a fraction of the space now needed and provides a stream of pure water that can legally be introduced into drains and septic systems or reused for washdown operations.

The invention can be mobile and thus taken to deleading sites so no trucking of hazardous wastes is involved.

The invention has proven to work in producing lead free wastes and lead enriched wastes for hazardous disposal.

This invention provides a method to treat waste wash fluids from the deleading process in a multistep process. It allows the concentration of lead residues into a fraction of the space now needed and provides a stream of pure water that can legally be introduced into drains and septic systems without harm to the environment or reused as a washdown fluid. The process can be mobile and thus taken to deleading sites so no trucking of hazardous wastes is involved.

One major problem with present lead removal systems is that they concentrate on using a chemical or physical removal that has the capability to reduce lead in one step to drinking water quality. As a result the problems of slow reactivity or expense noted earlier are nearly inescapable. The reactants that can treat and remove lead nearly completely are toxic such as hydrogen sulfide gas, expensive such as EDTA, or slow and limited in operations such as lime base reductions.

The present invention uses a chemical removal process that no ordinary chemist would suggest because it is only partially effective in lead removal. The chemical reaction in this invention is fast and causes a loose fluffy flocculent. It is simple and does not require tight pH control and works at a variety of concentrations. The chemistry of using epsom salts to precipitate lead is also not effective to the levels desired by environmentalists and would not allow reuse or dumping of the clear decanted water since it would still have considerable lead content.

The reduction in lead content is not treated as a one step chemical process or as a one step physical process. It first uses a inefficient fast chemical precipitation method which reduces the lead content and then couples this inefficient process with a physical lead removal system that would ordinarily be inefficient unless lead levels are much lower that those in washwater streams since high lead levels in non-pretreated deleading washwater would rapidly block reverse osmosis units.

The use of two systems coupled together, where each alone would be non acceptable and each alone would be seriously flawed as a process, provides an effective lead removal method. The use of a method to lower the lead levels using a fast but inefficient chemical precipitin method while allowing the remaining lead to be removed in a reverse osmosis unit that would normally be too quickly blocked if used to remove high levels of the lead works well with the wash water from deleading systems. The chemical precipitate is filtered or allowed to settle for recovery while the high lead content reject stream from the input side of the reverse osmosis unit is returned to the chemical precipitin tanks for further treatment. There is thus a way to treat (by recycling) the reject stream from the reverse osmosis stream which normally would be 30% to 70% of the input flow while the lead level is kept at a constant relatively low level by dumping the high lead reject stream and thus stop destructive buildup of lead in the reverse osmosis unit.

Figure 1:
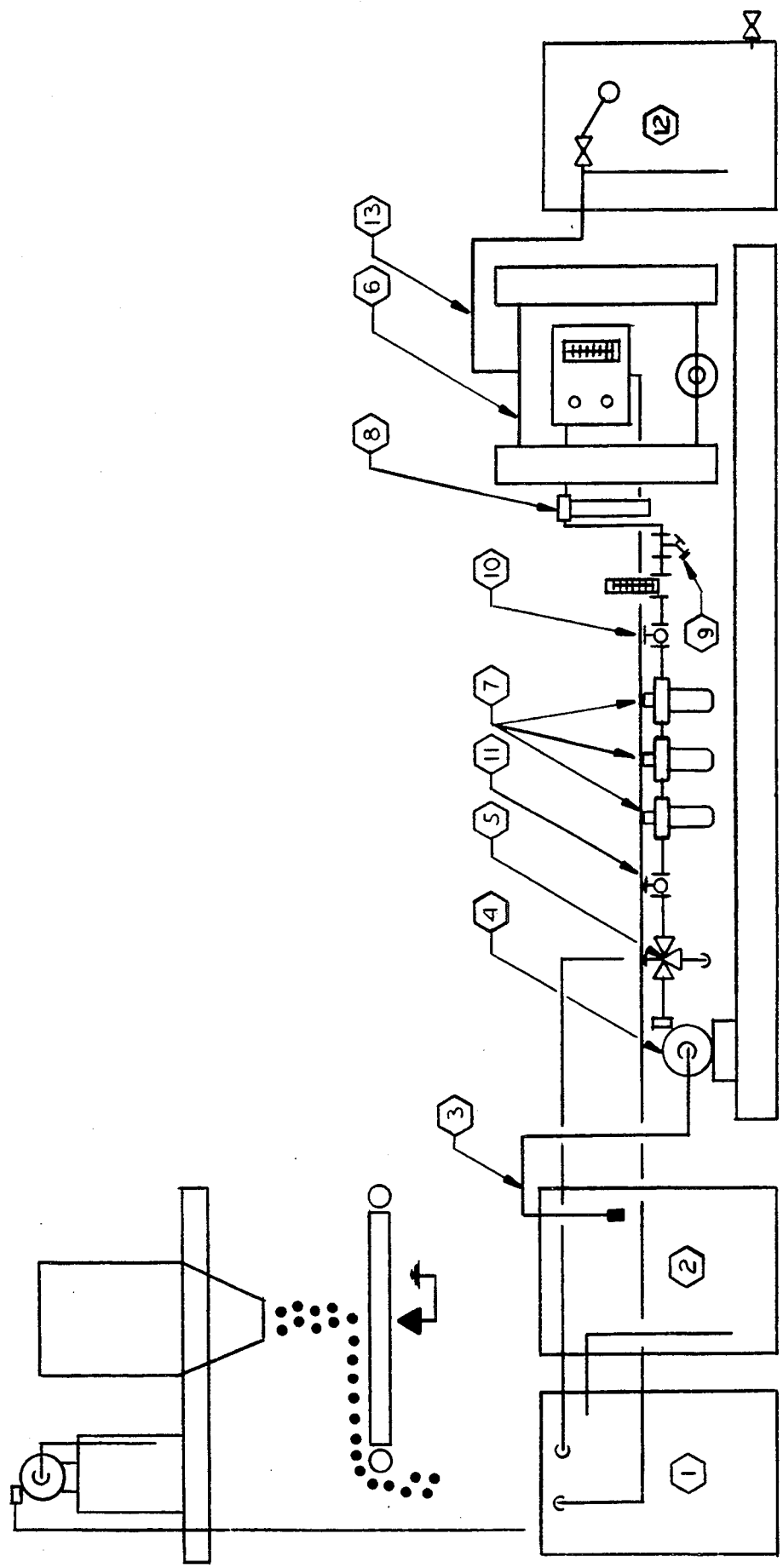
FIG. 1 shows a first set of process elements.

The process is best described by referral to the attached FIG. 1 to show the first set of process elements. The wastewater is vacuumed into transfer containers or directly to a large tank, 1, where it is conditioned. The conditioning is with use of acetic acid to provide a basically neutral solution. Epsom salts are added to cause precipitate to form. Agitation from a mixer promotes the needed mixing. The Epsom salt addition may be supplemented with flocculent agents which speed the settling of precipitates and help agglomerate the fine precipitated solids. The solution, after additions are made and the chemicals react, is a solution consisting of fine particle of paint in suspension, dissolved lead, and the residues of the alkaline strippers and the precipitated lead sulfate. While possibly high in phosphates, the solution is environmentally safe except for the high levels of lead as solids and in solution.

The conditioning tank has a slow flow and allows part of the suspended solids to settle to the bottom. The addition of acetic and epsom salts may be by automatic pH controllers or done manually with pH paper or probes controlling the addition levels. Nearly clear supernatant fluids are collected from near the top of the conditioning tank and transferred to a second tank, 2, which is a holding and surge tank. Further settling occurs in this tank and the settling is more effective since no chemical additions or agitation is needed in this tank. Fluid is pumped from the clearer top section of this tank from takeoff 3, by a pump 4. The flow volume can be controlled in a variety of ways, in this case it is controlled by the position of a three way valve 5 which allows a portion of the pump output to return to tank 1 or to tank 2.

A variety of other methods to control flow such as variable speed drive on the pump or pressure control has been used and is anticipated in this invention. The low uniform flow rate from valve 5 may enter an optional first solids interceptor which is a preliminary filter unit that is relatively coarse to pull out large particles. This can be a fixed screen filter but semi continuous or fabric cartridge filters may also be effective in this solids removal. The solids removed are a small portion of the total volume and are placed in drums at the filter change and remain as hazardous waste for treatment by others.

The multiple series filters arrayed and shown as 7 then is used to create a essentially particle free fluid containing all of the dissolved impurities. This filter is a 20 or lower micron size commercial cartridge filter. There are a number of these filters available on the market, often using a polymeric membrane as a filter media. The use of a coarser filter pore size, more filters, continuous filters, and centrifugal filters are also being considered. The use of the centrifugal filter is especially beneficial since no filter media is added to the hazardous waste removed from the site whereas the conventional filter media will be put into hazardous waste removed from the site. It is evident that the filtered cake or sludge is a hazardous waste that is still removed from the site along with the solid paint flakes.

An optional further filtration is now feasible using at least a pair of ultra fine sub micron filters to insure absolute freedom from particles. These filters are shown as 8 in the sketch. A series of sample ports are placed at key steps in the process since incoming, output and intermediate lead levels will be tested. The sample ports 9 allow testing of the lead levels at these points or installation of monitor instrumentation.

Following a disconnect valve 10, the super filtered fluid now enters a reverse osmosis unit shown as 6. Reverse osmosis is effective in removal of all molecules significantly larger than the water molecule. Lead and many other dissolved impurities at this stage is larger than the water molecule so it remains on the input side of the membrane as some of the smaller molecules such as water molecules pass through. The output of the reverse osmosis unit is a pure lead free stream 13 which goes to a holding tank 12 and a heavily contaminated lead containing stream 11 which is returned to the first conditioning tank. Typically up to ⅓rd of the water is removed in a pass through the reverse osmosis unit.

A current problem being solved is the need for frequent back flushing of the reverse osmosis units due to clogging of the pores by the large lead molecules. This problem barely exists in conventional uses of this technology for potable waters but in the enhanced lead concentrations used here it is a problem. High efficiency is needed in the back flush to make sure of a net removal of water. Flow rate and pressure drop are the present determinants of backflush times.

The water from the pure water holding tank can be returned as wash water by pumping it to a delivery line with pump 13 which leads to a pressure tank 15 and a spray hose 18.

The recycle lead/$H_2O$ stream, 11, is delivered back to the first tank. As the system continues to run, the lead levels in the water build up as the total volume is reduced and finally the concentrated lead containing fluids are drummed as hazardous waste. Typically, the amount of waste has been reduced to two or less drums and essentially all metallic contaminants are removed and remain in the concentrated fluid and solids that are the condensed hazardous waste portion of the process stream.

In a variation on the process, the recycle stream which contains elevated levels of lead is further treated. $H_2S$ precipitation of the lead or other lead removal methods are anticipated.

The process is described in simple terms. The process is simple enough to be truck mounted and brought to a site where the waste is generated, which eliminates major costs in hauling hazardous wastes. The waste could of course also be trucked to a common lead removal station.

The description of this process is representative of the current best version. It is anticipated that further refinements, controls and improvements will be made as the process is expanded into other uses that also have commercial viability. Likewise, the words used in this description should be considered within the context of this document and not given wider of different meanings.

Used in a reasonable manner, this process solves the current wash water removal problem and provides a reasonable cost alternate to illegal dumping or high cost removal of waste water in deleading operations.

DESCRIPTION OF THE DRAWINGS

In FIG. 1, the system is shown with the elements of the system are shown from the input tank 1 flowing through an overflow to a secondary settling tank 2 and then through a pump 3 which supplies a series of filters 4 and then through a flow control and measuring device 5 to a reverse osmosis unit, 6. The flows from the reverse osmosis unit are deleaded water going to a clean water tank 7 and lead containing reject stream 8 which is returned to the first tank for reprocessing. A sludge forms in the first and second tank 9 that is manually removed. Agitation of the first tank by a mixer 10 minimizes the sludge accumulation at that point. A set of two feeders 11 is provided to add acid or alkali for pH control and a further chemical feeder 12 is set to add epsom salts.

Figure 2:
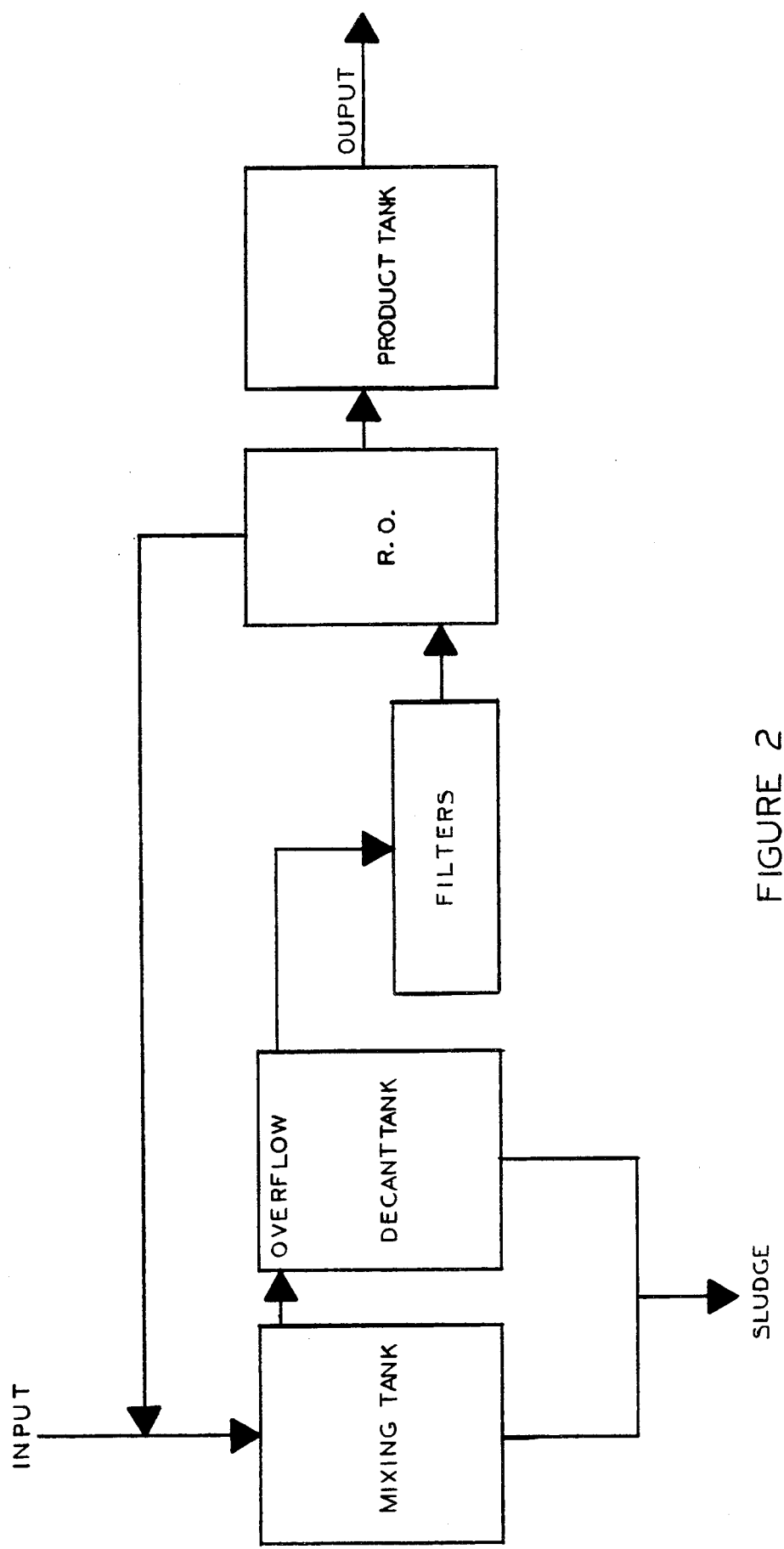
FIG. 2 shows a functional block form of the process.

In FIG. 2, the process is shown in functional block form indicating the key steps and functions needed for this process.

THE PREFERRED EMBODIMENT

In the most preferred embodiment of this invention a portable system is mounted on skids for on site lead removal. The base of the unit is a skid mounted drip pan that contains all drips.

The system has an initial reaction tank which is a large high density polyethylene rotomolded tank rectangular in shape that is reinforced by a wooden frame to add to its structural integrity. The tank is 3 foot by 4 foot by 4 foot and holds a total of 360 gallons of water. The reaction tank has side mounted sensors described below, a mixer, and feeders to supply needed chemicals. An overflow pipe of 2 inch diameter PVC is mounted 4 inches from the top of the tank with leak free flanges and extends outward from the tank to a second tank.

The first reaction tank is in hydraulic communication with a second settling tank by means of the overflow pipe which extends from the reaction tank into and below the liquid surface of this settling tank. The overflow pipe is capped and perforated to allow the fluid to flow out without causing a stirring action in the tank. This tank is also a large high density polyethylene rotomolded tank rectangular in shape that is reinforced by a wooden frame to add to its structural integrity. The tank is also 3 foot by 4 foot by 4 foot and holds a total 360 gallons of water. The settling tank allows the solids in the tank to be decanted and the liquid is pumped from the tank surface by a floating pump inlet hose which is connected to a filtration pump located below the settling tank.

The pump is a 30 GPM impeller pump with electrical motor operating on 110 volt single phase current so it can easily be used on construction sites and near housing on household current or by a small gasoline electrical generator. The motor is ½ Horsepower drive. A flow control loop is provided around the pump allowing part of the pump output stream to be recycled back to the pump inlet. This simple control allows an adjustment of the flow delivered to the filtration units by the pump.

The filtration system consists of a series of three filters which are the commonly used cartridge filters that are arranged in two or more parallel flow paths that extend from the pump to the reverse osmosis unit. Pressure gauges on the inlet and outlet indicate the loss in pressure and thus the clogging of the filters. The first two filters are less than 20 micron effective pore size and ideally 5 micron filters that are fiber wound cartridge filter types and the last filter is under a 5 micron pore size and ideally a 1 micron pore size final filter to remove the remaining solids.

The filters are commonly known PVC filters where the PVC bowl of the filters is easily removed by unscrewing it from a permanently attached top. The top also has air relief valves that allow the purging of air from each individual filter after the cartridge is changed. The piping from the pump consists of 1 inch Threaded pipe joints throughout. A ball valve is supplied on each inlet to the filters and a ball valve is installed after the filters so each series of filters can be isolated from the flow path when filters are changed. Each string of 3 filters is piped from a common infeed header supplied by the pump in parallel strings to a outflow header.

Flow meters are provided on the outflow header prior to the downstream equipment to allow an indication of filter blockage and to monitor throughput of the system. Pressure gauges may also be installed around the filters to measure the pressure drop through the filters which is an indicator of filter clogging.

The filtered fluid output is delivered to a header or plenum which has a rotameter mounted in it in a vertical plane with the fluid flowing upward through the plenum pipe so flow rate can be measured. The rotameter is a Brook manufactured stainless steel vertical unit with a 2.3 to 23 GPM indicator capacity read by calibrations on the glass tube. It has an accuracy of approx. 2%.

The output from the flow meter is the supply line to a series of parallel mounted reverse osmosis units. These reverse osmosis (RO) units are 6,000 GPD rated reverse osmosis units operating at 190 psig pressure. The input stream and the product stream are monitored by separate rotameters and the rates charted as an indicator of system efficiency. The flow meters can be supplemented with totalizing meters so the input and output are known for tracing purposes. This will allow accurate waste tracking records.

There are two flow streams that exit the RO units. The reject stream is the flow of lead contaminated water where the lead levels have been enhanced by the removal of part of the pure water. This stream is added to the reaction tank where the lead, now at higher levels, is partly precipitated by the chemical additives. The other stream is pure deleaded water and this is piped to a storage tank. While this cleaned fluid can be drained into sewers or otherwise disposed of, the most common use for this clean water stream is a supply to the rinse and neutralization wash water sprayers used in the chemical stripping process. This makes the system a closed loop system, thus eliminating most of the water waste stream.

The tanks have been discussed, but the additives and feeders have not at this point. In the most preferred embodiment the additives are controlled as a function of the pH of the inlet stream such that there is an excess of reactive chemicals at all times in the system. Since the chemical reaction is effective over a wide range of pH, the system may be operated with a further alkali additive into the storage tank so in the case of deleading of steel, the wash water will not promote rust formation. Since the chemical additives are low in cost, an excess over the stoichiometric ratio is used to simplify the system.

The preferred additive is epsom salts, a hydrated form of magnesium sulfate. This material is excellent for the use since it is easily soluble, with 71 grams soluble in 100 ml of cold (20 degree C.) water and 91 grams soluble in hot water at 40 degrees C. The solubility can be contrasted to that of potassium sulfate at less than $\frac{1}{4}$ of the solubility. The epsom salts are cheap, easy to handle, and as long standing medical purge, are safe. Other sulfates are usable but the process is especially effective with $MgSO_4$. The reaction product, lead sulfate has a 0.0001 grams per 100 ml solubility at 18 degrees C. and it is only slightly soluble in strong sulfuric acid solutions so the process is effective in lowering the lead levels, although not to the insoluble in water found with lead sulfide or some forms of lead carbonate or even the 0.000014 gms per 100 ml level achievable with orthophosphates.

In using this process the total waste is typically reduced by more than 90% with the waste product being a wet sludge and the filter cartridges. While the sludge could be further dried, at present the reduction is sufficient for commercial use.

I claim:

1. A mobile unit for removing chlorine and heavy metals from a waste water stream, comprising:
    first means for precipitating a major portion of said heavy metals from said stream including a mixing tank having an inlet for receiving said stream and precipitating chemicals, an overflow outlet, and sludge outlet, and further including a decant tank having an inlet for communicating with said overflow outlet, a decant outlet, and a sludge outlet;
    second means for removing said chlorine and remaining heavy metals, including a series of at least two filters, any one upstream of which having a larger pore size, than any one downstream of which; said series having an inlet for communicating with said decant outlet and a filter outlet; and a reverse osmosis unit having and inlet for communicating with said filter outlet, a reject outlet for communicating with said mixing tank inlet and a potable water outlet; and
    means for enabling mobile transport of said unit to a source of waste water.

2. A process for removing chlorine and heavy metals from a waste water stream, comprising:
    providing a mobile unit for removing chlorine and heavy metals from a waste water stream, which comprises:
    first means for precipitating a major portion of said heavy metals from said stream, including a mixing tank having an inlet for receiving said stream and precipitation chemicals, an overflow outlet, and a sludge outlet, and further including a decant tank having an inlet for communicating with said overflow outlet, a decant outlet and a sludge outlet;
    second means for removing said chlorine and remaining heavy metals, including a series of at least two filters, any one upstream of which having a larger pore size than any one downstream of which; said series having an inlet for communicating with said decant outlet and a filter outlet; and a reverse osmosis unit having an inlet for communicating with said mixing filter outlet, a reject outlet for communicating with said mixing tank inlet and a potable water outlet; and
    means for enabling mobile transport of said unit to a source of waste water;
    mobilizing said transporting unit to a source of water which contains chlorine and heavy metals;
    feeding a stream of said waste water into said inlet for receiving said stream; and
    withdrawing potable water from said potable water inlet.

3. The process in 2 where the chemicals used include epsom salts or magnesium sulfate.

4. The process in 3 where said epsom salts of magnesium sulfate are used in a controlled pH ranging from 6 to 8.

5. The process in 4 where the pH of the chemical and wastewater mixture is controlled by addition of acetic acid 6. The process in 4 where the pH of the chemical and wastewater mixture is controlled by a mineral acid which has ions with molecular size greater than that of water.

7. The process in 4 where said pH additives are intermixed with said epsom salts in a ratio that adds an excess of epsom salts to ensure precipitation.

8. The process in 4 where a secondary filter is utilized prior to said reverse osmosis unit which has smaller pore size than said series of filters, said secondary filter protecting said reverse osmosis unit.

9. The process in 5 where the pH is controlled by automatic controlling means.

10. The process in 2 where an additional pump is supplied to ensure pressure and flow to said reverse osmosis unit.

11. The process of claim 2 wherein
    lead containing wastewater is first introduced into a tank, and
    then the pH of said wastewater is adjusted to between 6 and 8,
    then potassium sulfate or magnesium sulfate is added in an amount in excess of the stoichiometric ratio required for precipitation of said dissolved lead content in said lead containing wastewater, treating said wastewater to remove part of said dissolved lead,
    then the treated wastewater solution is agitated to mix it and,
    then after agitation, said wastewater is allowed to settle into a supernatant fluid and a precipitated sludge, and
    then the supernatant fluids are decanted, and
    the decanted supernatant fluids are filtered, and the filtered fluids are then treated with reverse osmosis, the lead free stream being stored, reused or dumped and the reject stream containing raised lead levels being returned to said tank.

12. The process in 11 where a series of tanks is employed and where the first tank is used to adjust pH and add chemicals and one or more secondary tank is used to settle precipitate from said treated wastewater.

13. The process in 12 where said secondary tanks are baffled to enhance settling of precipitates.

14. The process in 12 where said secondary tanks have additive feeders feeding a flocculating compound which enhances said settling of precipitate.

15. The process in 11 where a filter is added to remove precipitated sludge from the bottom of said tank and said sludge filtrate is returned to said tank.

16. The process in 15 where the filter is a centrifugal filter.

17. The process in 11 where a preliminary step is added which is a screen filtration to remove scrapings and large solid lumps.

18. The process in 11 where said reverse osmosis unit is further backflushed by backflushing means using the lead free water stream to reduce clogging of the reverse osmosis membrane.

* * * * *